United States Patent
Nakano et al.

(10) Patent No.: US 9,627,944 B2
(45) Date of Patent: Apr. 18, 2017

(54) ELECTRIC DRIVE APPARATUS

(71) Applicants: Masatsugu Nakano, Tokyo (JP); Satoru Akutsu, Tokyo (JP); Isao Sonoda, Tokyo (JP); Kohei Ushio, Tokyo (JP); Yoshihito Asao, Tokyo (JP)

(72) Inventors: Masatsugu Nakano, Tokyo (JP); Satoru Akutsu, Tokyo (JP); Isao Sonoda, Tokyo (JP); Kohei Ushio, Tokyo (JP); Yoshihito Asao, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 286 days.

(21) Appl. No.: 14/410,923

(22) PCT Filed: Oct. 1, 2012

(86) PCT No.: PCT/JP2012/075385
§ 371 (c)(1),
(2) Date: Dec. 23, 2014

(87) PCT Pub. No.: WO2014/054098
PCT Pub. Date: Apr. 10, 2014

(65) Prior Publication Data
US 2015/0333600 A1    Nov. 19, 2015

(51) Int. Cl.
*H02K 11/00*    (2016.01)
*H02K 29/08*    (2006.01)
(Continued)

(52) U.S. Cl.
CPC ......... *H02K 11/0021* (2013.01); *H02K 11/33* (2016.01); *H02K 29/08* (2013.01); *H02K 11/215* (2016.01); *H02K 2211/03* (2013.01)

(58) Field of Classification Search
CPC . H02K 11/21; H02K 11/0021; H02K 11/0073
(Continued)

(56) References Cited

U.S. PATENT DOCUMENTS

| 7,498,701 | B2 * | 3/2009 | Kikuchi | ............... | H02K 11/048 |
| | | | | | 310/68 B |
| 2001/0011848 | A1 * | 8/2001 | Yamamura | ............. | H02K 11/21 |
| | | | | | 310/68 B |

(Continued)

FOREIGN PATENT DOCUMENTS

| EP | 1 323 956 A2 | 2/2003 |
| JP | 1171563 U | 12/1989 |

(Continued)

OTHER PUBLICATIONS

International Search Report of PCT/JP2012/075385 dated Nov. 13, 2012.

(Continued)

*Primary Examiner* — Thanh Lam
(74) *Attorney, Agent, or Firm* — Sughrue Mion, PLLC; Richard C. Turner

(57) ABSTRACT

Provided is an electric drive apparatus in which a detected portion (10) of a rotation angle sensor is disposed at an end of a shaft (7) of a motor, and a sensor portion (300) as a detection portion of the rotation angle sensor is disposed coaxially with the rotating axis of the shaft. In a control unit (200), an inverter circuit portion with a drive element (SW) for driving the motor, and a control substrate (17) which is separate from the sensor portion and controls the output of the inverter circuit portion are disposed. The sensor portion and the control substrate are electrically connected, with the control substrate disposed along a plane perpendicular to the rotating axis of the shaft.

14 Claims, 14 Drawing Sheets

(51) Int. Cl.
*H02K 11/33* (2016.01)
*H02K 11/215* (2016.01)

(58) Field of Classification Search
USPC .................. 310/71, 68 B, 68 D, 68 R, 64
See application file for complete search history.

(56) References Cited

U.S. PATENT DOCUMENTS

| | | |
|---|---|---|
| 2003/0135314 A1 | 7/2003 | Saito et al. |
| 2005/0236219 A1 | 10/2005 | Saito et al. |
| 2007/0200560 A1 | 8/2007 | Saito et al. |
| 2007/0216240 A1 | 9/2007 | Kikuchi et al. |
| 2007/0272472 A1 | 11/2007 | Matsubara et al. |
| 2008/0024021 A1 | 1/2008 | Tsukashima et al. |
| 2011/0019650 A1 | 1/2011 | van Niekerk |
| 2011/0031851 A1* | 2/2011 | Uryu ................... H02K 11/024 310/68 B |
| 2011/0254388 A1 | 10/2011 | Yamasaki |
| 2011/0285223 A1* | 11/2011 | Miyachi ................. H02K 11/33 310/64 |
| 2012/0161590 A1* | 6/2012 | Yamasaki .............. H02K 5/225 310/68 B |
| 2012/0176073 A1 | 7/2012 | Amagasa |
| 2012/0229005 A1* | 9/2012 | Tominaga ............ B62D 5/0406 310/68 B |
| 2013/0257194 A1 | 10/2013 | Yamasaki |

FOREIGN PATENT DOCUMENTS

| | | |
|---|---|---|
| JP | 2002-345211 A | 11/2002 |
| JP | 2002345211 A | 11/2002 |
| JP | 2007-060734 A | 3/2007 |
| JP | 2007-062433 A | 3/2007 |
| JP | 200760734 A | 3/2007 |
| JP | 2007318972 A | 12/2007 |
| JP | 2010-187491 A | 8/2010 |
| JP | 2011-041355 A | 2/2011 |
| JP | 2011-229228 A | 11/2011 |
| JP | 2012-147519 A | 8/2012 |
| JP | 2012147519 A | 8/2012 |
| WO | 2006/080567 A1 | 8/2006 |
| WO | 2011/011455 A1 | 1/2011 |

OTHER PUBLICATIONS

Communication dated May 11, 2016, issued by the European Patent Office in counterpart Application No. 12886025.1.
Communication dated May 19, 2015, issued by the Japanese Patent Office in counterpart Application No. 2014-539495.
Communication dated Jul. 5, 2016, from the Japanese Patent Office in counterpart application No. 2015-130642.
Communication dated Jan. 31, 2017 from the Japanese Patent Office in counterpart application No. 2015-130642.

* cited by examiner

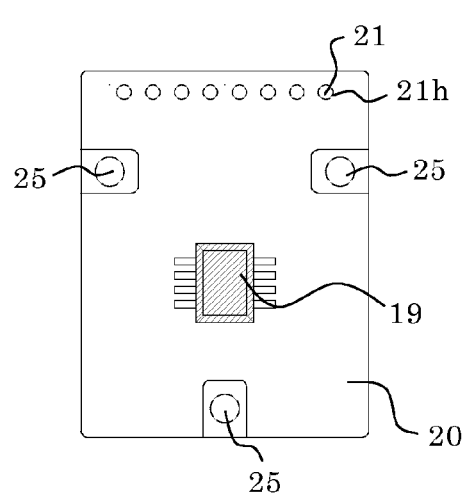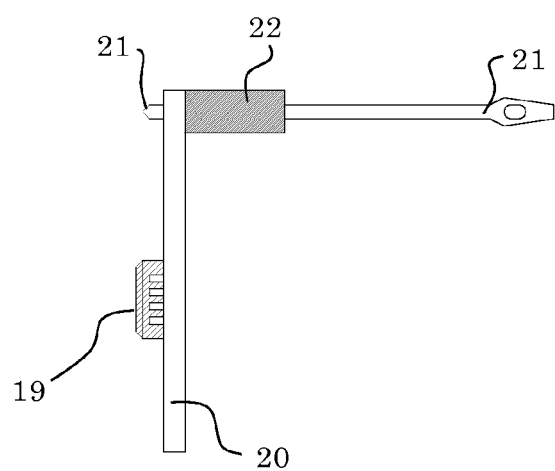
FIG. 3A
FIG. 3B (a)

(b)

(a)

(b)

ELECTRIC DRIVE APPARATUS

CROSS REFERENCE TO RELATED APPLICATIONS

This is a National Stage of International Application No. PCT/JP2012/075385 filed Oct. 1, 2012, the contents of which are incorporated herein by reference in its entirety.

TECHNICAL FIELD

The present invention relates to an electric drive apparatus in which a motor and a control unit (drive device portion) that controls driving of the motor are integrally configured and, more particularly, relates to an electric drive apparatus suitable for use an electric power steering apparatus for a vehicle.

BACKGROUND ART

The structure of an electric drive apparatus for an electric power steering apparatus has been heretofore devised and, for example, the following patent documents are known as the arrangement and structure of a rotation angle sensor.

PRIOR ART DOCUMENT

Patent Document

Patent Document 1: Japanese Unexamined Patent Publication No. 2011-41355
Patent Document 2: Japanese Unexamined Patent Publication No. 2011-229228

SUMMARY OF THE INVENTION

Problems to be Solved by the Invention

However, in the structure of Patent Document 1, a shaft inserts through a circuit portion; and thus, the distance from a bearing to a permanent magnet is long and accordingly runout of the permanent magnet tends to be increased. If the runout is large, a magnetic field of a semiconductor magnetic sensor portion comes off from a desired state; and accordingly, the detection accuracy of a rotation angle is deteriorated and an angle error is increased. As a result, a problem exists in that vibration and/or noise of the motor is increased. Furthermore, a problem exists in that, in the structure of Patent Document 2, a rotation angle sensor is susceptible to noise from an inverter circuit portion and noise from a control substrate of a power module or the like.

Besides, a problem exists in that, in both Patent Document 1 and Patent Document 2, a sensor is mounted on a control substrate and accordingly the mounting area of the control substrate is reduced by just that much.

The present invention has been made to solve the above described problem, and an object of the present invention is to provide an electric drive apparatus in which runout of a shaft is reduced, the detection accuracy of a rotation angle is improved, and in addition, noise interference from an inverter circuit and a control substrate is reduced.

Means for Solving the Problems

According to the present invention, there is provided an electric drive apparatus equipped with a motor and a control unit serving as a drive device portion disposed on the opposite side to the output axis side of the motor, the electric drive apparatus including: detected portion of a rotation angle sensor, the detected portion being disposed at an end of a shaft on the opposite side to the output axis side of the motor; and a sensor portion serving as a detection portion of the rotation angle sensor, the sensor portion being disposed at a position coaxially with the rotating axis of the shaft. The control unit includes an inverter circuit portion having a drive element which is attached to a heat sink and is for driving the motor and control substrate which is separate from the sensor portion and controls the output of the inverter circuit portion; and the sensor portion and the control substrate are electrically connected and the arrangement of the control substrate is disposed along a plane perpendicular to the rotating axis of the shaft of the motor.

Advantageous Effect of the Invention

According to the electric drive apparatus of the present invention, the control substrate and the sensor portion of a rotation angle are separately configured, whereby the mounting area of the control substrate can be enlarged. Furthermore, the distance between a bearing and a permanent magnet serving as the detected portion of the rotation angle sensor, the detected portion being disposed at the shaft end, is reduced, whereby runout is reduced; and as a result, there can be obtained effects that the detection accuracy of the rotation angle is improved and vibration and/or noise of the motor can be reduced.

Besides, noise interference from the inverter circuit and the control substrate to the rotation angle sensor can be reduced and the arrangement of the control substrate is disposed along the plane perpendicular to the rotating axis of the motor, whereby there exists an effect that the axial length of an electronic control unit (ECU) serving as the control unit can be shortened as compared with arrangement (vertical arrangement) where the control substrate is disposed along a flat plane parallel to the rotating axis.

The foregoing and other objects, features, and advantageous effects of the present invention will become more apparent from detailed description in the following embodiments and description in the accompanying drawings,

BRIEF DESCRIPTION OF THE DRAWINGS

FIGS. 3A and 3B are each an explanation view of a sensor portion disposed in the electric drive apparatus of Embodiment 1 of the present invention;

MODE FOR CARRYING OUT THE INVENTION

Figure 1:
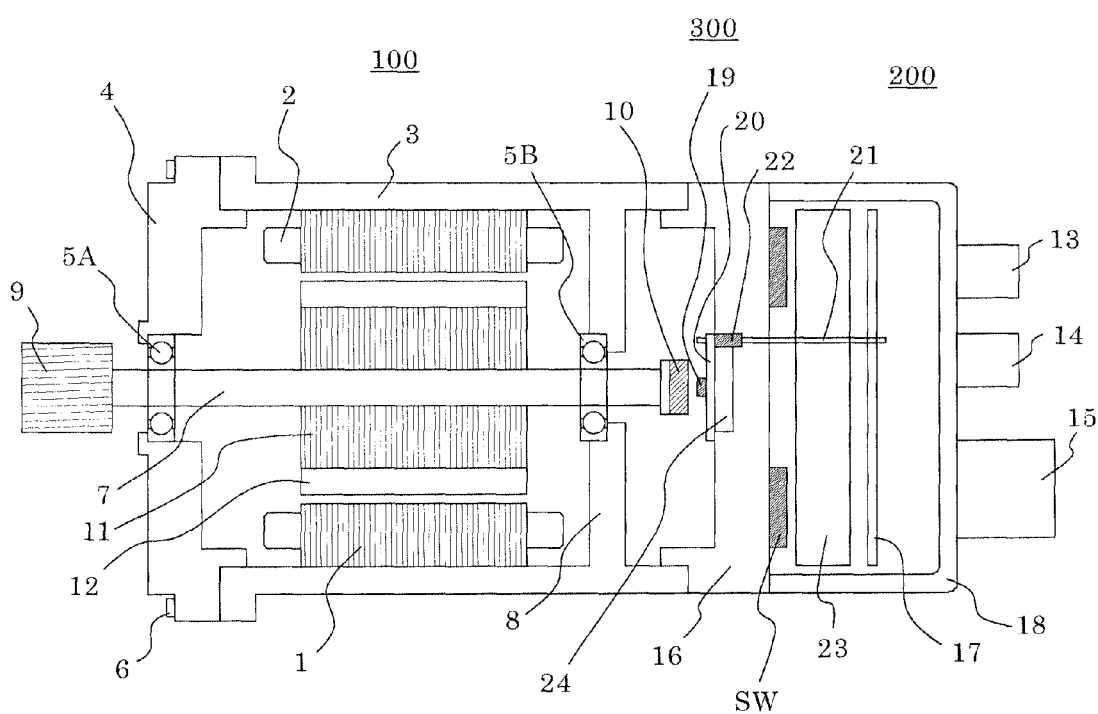
FIG. 1 is a schematic configuration view showing the whole configuration of an electric drive apparatus according to Embodiment 1 of the present invention.

Hereinafter, embodiments of an electric drive apparatus of the present invention will be described by using drawings. Incidentally, the same reference numerals as those shown in the respective drawings represent the same or corresponding elements.

Embodiment 1

FIG. 1 is a schematic configuration view showing the whole configuration of an electric drive apparatus according to Embodiment 1 of the present invention.

In FIG. 1, the electric drive apparatus is structured such that a permanent magnet type motor 100 and an electronic control unit (ECU) serving as a control unit are integrated. First, the permanent magnet type motor 100 will be described.

The permanent magnet type motor (hereinafter, merely referred to as a "motor") 100 has a stator core 1 formed by laminating magnetic steel sheets, an armature winding 2 wounded around the stator core 1, and a frame 3 that fixes the stator core 1. The frame 3 is fixed to a housing 4 disposed on a front portion of the motor by bolts 6. A bearing 5A is disposed on the housing 4 and the bearing 5A rotatably supports a shaft 7 together with a bearing 5B. The bearing 5B is supported by a wall portion 8 that is disposed integrally with or separately from the frame 3.

A pulley 9 is press-fitted at one tip end of the shaft 7, that is, on the output axis side; and the pulley 9 is operable to transfer driving force to a belt of an electric power steering apparatus to be described later.

A permanent magnet for a sensor 10, serving as a detected portion of a rotation angle sensor, is disposed at the other tip end of the shaft 7. A rotor core 11 is press-fitted onto the shaft 7 and a permanent magnet 12 is fixed to the rotor core 11. Incidentally, FIG. 1 shows an example in which the permanent magnet 12 is fixed to the surface of the rotor core 11; however, the permanent magnet 12 may be structured to be embedded in the rotor core 11.

Next, an electronic control unit (ECU) 200 serving as the control unit will be described.

The ECU 200 is provided with a first connector 13 that receives a signal from a torque sensor, a second connector 14 that receives automobile information such as vehicle speed, and a power source connector 15 for supplying power source. Further, the ECU 200 includes an inverter circuit which is for driving the motor; and the inverter circuit has a switching element SW such as a metal oxide semiconductor field effect transistor (MOSFET). As the switching element SW, there is conceivable, for example, a configuration in which a bare chip is mounted on a direct bonded copper (DBC) substrate and a configuration in which a bare chip is a module molded with resin.

Current for driving the motor flows in the switching element SW, thereby generating heat. Consequently, the switching element SW is structured to dissipate the heat by being brought into contact with a heat sink 16 via adhesive, an insulation sheet, or the like.

The inverter circuit includes a smoothing capacitor, a coil for eliminating noise, a power source relay, busbars for electrically connecting those components, and the like, in addition to the switching element SW; however, such components are omitted in FIG. 1. The busbars are integrally formed with resin to form an intermediate member 23. Furthermore, a control substrate 17 is disposed next to the intermediate member 23. The control substrate 17 sends a control signal to the switching element SW for adequately driving the motor on the basis of the information received from the first connector 13 and the second connector 14.

The control signal is transmitted by a connection member (not shown in the drawing) which electrically connects between the control substrate 17 and the switching element SW. The connection member is fixed by wire-bonding, press-fitting, soldering, or the like. The inverter circuit and the control substrate 17 are covered by a case 18. The case 18 may be made of resin; or even in the case of metal such as aluminum, the case 18 may be configured such that resin and metal such as aluminum are combined.

The arrangement of the control substrate 17 is disposed along a plane perpendicular to the rotating axis of the shaft 7 of the motor. The control substrate 17 is configured to be disposed in this arrangement; and thus, there exists an effect that the axial length of the ECU 200 can be shortened as compared with a case (vertical arrangement) where the control substrate 17 is disposed along a flat plane parallel to the rotating axis of the shaft 7. Incidentally, even if the control substrate 17 is not necessarily disposed along the plane perpendicular to the rotating axis, there can be obtained an effect that the axial length can be shortened if the control substrate 17 is not disposed along the flat plane parallel to the rotating axis.

A sensor portion 300 is disposed on the heat sink 16 on the side near to the motor 100. The sensor portion 300 has a magnetic sensor 19, a substrate 20, a connection member 21, and a supporting member 22; and the substrate 20 mounted with the magnetic sensor 19 is fixed to the heat sink 16 by screws (not shown in the drawing).

The fixing of the substrate 20 to the heat sink 16 that is subjected to a large change in temperature under the influence of the heat generation of the switching element SW, is made by screw-fastening; and therefore, there exist effects that the screw-fastening is resistant to rise in temperature and heat cycle as compared with the adhesive.

The magnetic sensor 19 is disposed at a position coaxially with the rotating axis of the shaft 7 and corresponding to the permanent magnet for the sensor 10. The magnetic sensor 19 detects a magnetic field generated by the permanent magnet for the sensor 10 and detects a rotation angle of a rotor of the motor by knowing the direction of the magnetic field.

The ECU 200 supplies an adequate drive current to the motor 100 according to the rotation angle.

Furthermore, the connection member 21 is supported by the supporting member 22 and electrically connects the substrate 20 and the control substrate 17 of the sensor portion 300. This connection may be made by press-fitting or soldering. Incidentally, the connection member 21 needs to pass through the heat sink 16 and the intermediate member 23; and thus, a hole portion (not shown in the drawing) through which the connection member 21 passes through is formed in the heat sink 16 and the intermediate member 23. Further, although not shown in the drawing, the intermediate member 23 is configured such that a guide capable of positioning the connection member 21 is provided. By this configuration, electrical connection between the sensor portion 300 and the control substrate 17 can be smoothly performed and productivity is improved.

A concave portion 24 is formed in the heat sink 16 in FIG. 1, thereby increasing the distance between the magnetic sensor 19 mounted on the substrate 20 of the sensor portion 300 and the surface of the heat sink 16. The heat sink 16 is fixed to the frame 3 of the motor 100 by screws, shrink-fitting, or the like.

The heat sink 16 is fixed to the frame 3 of the motor 100 in such a manner, the heat of the heat sink 16 can be transferred to the frame 3 of the motor 100.

Figure 2:
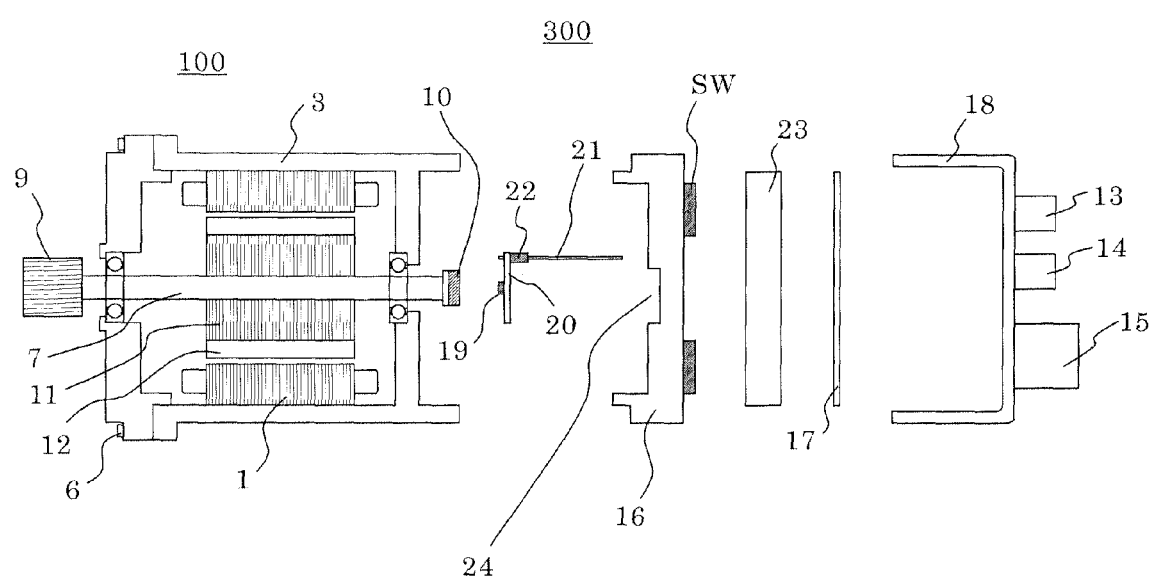
FIG. 2 is an explanation view of constituent components in which respective components of the electric drive apparatus of FIG. 1 are axially lined up.

FIG. 2 is a view in which respective components are axially separated and lined up to help understanding of the configuration of the electric drive apparatus of FIG. 1.

The sensor portion 300 is assembled by integrating the substrate 20, the magnetic sensor 19, the supporting member 22, and the connection member 21. The connection member 21 of the sensor portion 300 passes through the heat sink 16 and the intermediate member 23 to be electrically connected to the control substrate 17. Press-fitting or soldering is known as the connection method. The arrangement of the control substrate 17 is disposed along a plane perpendicular to the rotating axis of the motor 100. If, in the case of this configuration, the extending direction of the connection member 21 to be electrically connected to the sensor portion 300 is perpendicular to the control substrate 17; and therefore, there exists an effect that assembly is easy when the connection member 21 is fixed by press-fitting or soldering. The switching element SW is fixed to the heat sink 16 via the adhesive or the insulation sheet. The case 18 of the ECU 200 equipped with the first connector 13, the second connector 14, and the power source connector 15 is fixed to the heat sink 16 via adhesive or screws. The heat sink 16 is fixed to the frame 3 of the permanent magnet motor 100 by shrink-fitting or bolts.

FIG. 3 are each an explanation view of the sensor portion (detection portion) disposed in the electric drive apparatus of Embodiment 1 of the present invention; (a) is a seen from the front side; and (b) is a view seen from the lateral side. The magnetic sensor 19 is mounted on the substrate 20; the supporting member 22 integrated with the connection member 21 is disposed on the substrate 20; and the connection member 21 and the substrate 20 are fixed by press-fitting or soldering. Incidentally, the magnetic sensor 19 may be configured by a magneto-resistance effect element (MR element), an anisotropic magneto-resistance element (AMR element), a giant magneto-resistance effect element (GMR element), a tunneling magneto-resistance element (TMR element), or the like.

The connection member 21 on the opposite side to the substrate 20 when viewed from the supporting member 22 is electrically connected to the control substrate 17 and this is also fixed by press-fitting or soldering. In the case of fixing by press-fitting, the space between the connection members 21 can be narrowed; and therefore, reduction in size of the sensor portion 300 and the control substrate 17 can be achieved. Further, solder is not used and therefore there also exists an effect that a manufacturing process is simplified.

The substrate 20 is formed with three screw holes 25 and is fixed to the heat sink 16 by screws by using the holes 25. Incidentally, the number of the screw holes 25 is not limited to three and the position of the screw holes 25 is not limited to the position of FIG. 3. As shown in FIG. 3, the control substrate 17 and the sensor portion 300 of the rotation angle are configured by separate substrates; and therefore, there also exists an effect that the mounting area of the control substrate can be enlarged as compared with a case where the magnetic sensor 19 is mounted on the control substrate 17.

Figure 4:
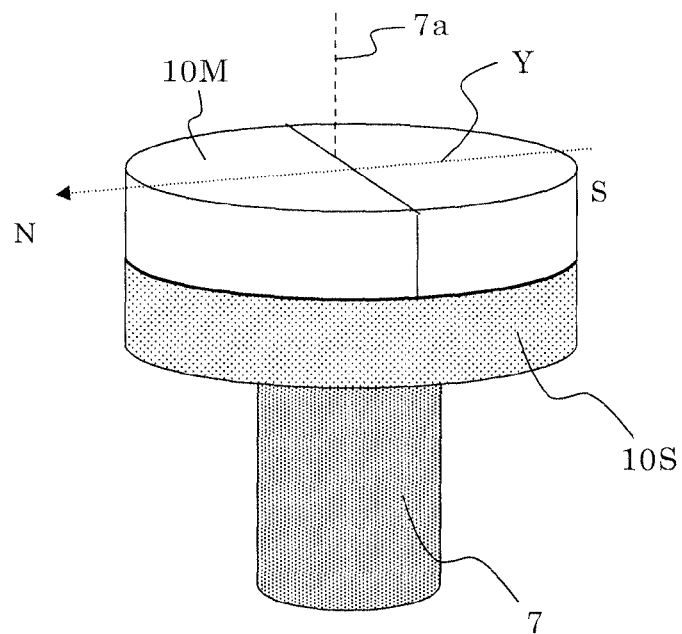
FIG. 4 is an explanation view showing an example of a permanent magnet for a sensor, which is disposed in the electric drive apparatus of Embodiment 1 of the present invention.
Figure 5:
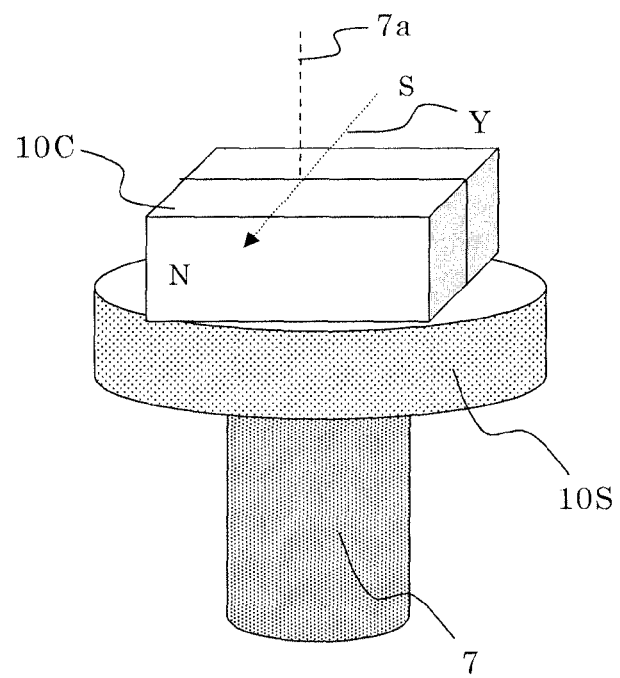
FIG. 5 is an explanation view showing other example of the permanent magnet for the sensor, which is disposed in the electric drive apparatus of Embodiment 1 of the present invention.

FIG. 4 and FIG. 5 are each a perspective view of a portion of the permanent magnet for the sensor (detected portion) 10.

FIG. 4 shows a configuration example having a cylindrical shape. A permanent magnet 10M is magnetized in the direction of an arrow Y of the drawing and is a two pole permanent magnet. Incidentally, this direction Y is formed on a flat plane perpendicular to a rotating axis 7a of the rotor. The permanent magnet 10M is configured by a neodymium bonded magnet, a neodymium sintered magnet, a ferrite magnet, or the like and is fixed by a permanent magnet supporting portion 10S.

The fixing may be made by adhesive or may be configured to be fixed each other by being integrated with the permanent magnet supporting portion 10S in the case of the bonded magnet. In order to reduce the influence on a magnetic field generated by the permanent magnet 10M, the permanent magnet supporting portion 10S may be made of stainless steel based or aluminum based non-magnetic metal or resin. Further, the permanent magnet supporting portion 10S is fixed to the shaft 7 by press-fitting or the like.

FIG. 5 shows a configuration example in which the permanent magnet has a cuboid-shape. A permanent magnet 10C is magnetized in a direction of an arrow Y of the draw and is a two pole permanent magnet. Incidentally, this direction Y is formed on a flat plane perpendicular to the rotating axis 7a of the rotor. The permanent magnet 10C is configured by a neodymium bonded magnet, a neodymium sintered magnet, a ferrite magnet, or the like and is fixed by a permanent magnet supporting portion 10S. The fixing may be made by adhesive or may be configured be fixed each other by being integrated with the permanent magnet supporting portion 10S in the case of the bonded magnet. In order to reduce the influence on a magnetic field generated by the permanent magnet 10C, the permanent magnet supporting portion 10S may be made of stainless steel based or aluminum based non-magnetic metal or resin. Further, the permanent magnet supporting portion 10S is fixed to the shaft 7 by press-fitting or the like.

The magnetized directions of the permanent magnets 10M and 10C, are each formed on the flat plane perpendicular to the rotating axis 7a. Thus, magnetic flux density generated in the proximity of the magnetic sensor includes: a vector component formed on the flat plane perpendicular to the rotating axis 7a, the vector component being a main component; and a component of a rotating axis direction, the component being extremely small. Furthermore, the magnetic sensor 19 detects the direction of the magnetic flux density on the flat plane perpendicular to the rotating axis 7a. Thus, the direction of the magnetic flux density is hardly changed even if there exists eccentricity and/or runout; and therefore, there has an effect that a rotation angle can be detected with high accuracy.

As shown in FIG. 4, the cylindrically shaped magnet is used and thus the generated magnetic flux density becomes uniform. As a result, the magnetic flux density in the proximity of the magnetic sensor also becomes uniform; and therefore, there exists an effect that the detection accuracy of the rotation angle can be improved.

Furthermore, as shown in FIG. 5, when the cuboid shaped magnet is used, as in the cylindrically shaped magnet of FIG. 4, the generated magnetic flux density becomes uniform and the magnetic flux density in the proximity of the magnetic sensor also become uniform; and therefore, in addition to the effect that the detection accuracy of the rotation angle can be improved, there can also be obtained effects that the cuboid magnet is easy in manufacturing and material yield ratio can be improved as compared with a complicated shape in the case of the sintered magnet.

As described above, according to the electric drive apparatus of Embodiment 1 of the present invention, there can be obtained the following excellent effects.

(1) The control substrate 17 and the sensor portion 300 serving as the detection portion of the rotation angle are configured by the separate substrates; and thus, the mounting area of the control substrate 17 can be enlarged.

(2) The distance between the bearing 5B and the permanent magnet 10 serving as the detected portion of the rotation angle sensor, the detected portion being disposed at the end of the shaft 7, is reduced; and thus, runout and/or eccentricity is reduced. As a result, there can be obtained effects that the detection accuracy of the rotation angle is improved and vibration and/or noise of the motor can be reduced. Further, there can be obtained an effect that noise interference from the inverter circuit and the control substrate 17 to the rotation angle sensor can be reduced.

(3) The connection member 21 that electrically connects the sensor portion 300 to the control substrate 17 passes through the inverter circuit portion; and therefore, there exists an effect that the electric drive apparatus can be reduced in size. Furthermore, the sensor portion 300 is electrically connected to the control substrate 17 directly; and therefore, there exists an effect that the electric drive apparatus can be reduced in size.

(4) The electrical connection between the sensor portion 300 and the control substrate 17 is configured to be positioned by the intermediate member 23; and therefore, there exists an effect that a requirement value of the accuracy of a component can be relaxed.

(5) Press-fitting is used for the electrical connection between the sensor portion 300 and the control substrate 17; and thus, the connection can be made without using solder. The space between the connection members can be reduced. Thus, even if a large number of connection members 21 are disposed side by side, width is reduced as compared with a case where the connection is made by solder; and therefore, it becomes possible to reduce in size of the electric drive apparatus.

(6) The control substrate equipped with the rotation sensor is more posteriorly located than the circuit portion in the conventional Patent Document 1 and accordingly the distance from the bearing to the rotation sensor is long; whereas, in the configuration of the present Embodiment 1, the magnetic sensor 19 is disposed near to the bearing 5B and therefore the distance between the bearing 5B and the permanent magnet for the sensor 10 is close. Thus, runout and/or eccentricity at an end of the shaft is reduced; and therefore, as a result, there can be obtained effects that runout and/or eccentricity of the permanent magnet for the sensor is reduced, the detection accuracy of the rotation angle is improved, and vibration and/or noise of the motor is reduced.

(7) Further, in Embodiment 1 of FIG. 1, the concave portion 24 is formed on the heat sink 16 to increase the distance between the magnetic sensor 19 mounted on the substrate 20 of the sensor portion 300 and the surface of the heat sink 16. The temperature of the heat sink 16 increases due to heat generation of the switching element SW during the driving of the motor. If the concave portion 24 is not provided and the distance between the heat sink 16 and the magnetic sensor 19 is extremely close, the heat of the heat sink 16 is transferred to the magnetic sensor 19, and the temperature of the magnetic sensor 19 becomes extremely high; and accordingly, there are also conceivable cases where the detection accuracy of the rotation angle is deteriorated and the magnetic sensor 19 is not operated due to an excessive rise in temperature.

However, the concave portion 24 is formed on the heat sink and thus the distance between the heat sink 16 and the magnetic sensor 19 can be increased. Therefore, there exist effect that the rise in temperature of the magnetic sensor 19 is reduced and the accuracy of the rotation angle can be improved.

Figure 6:
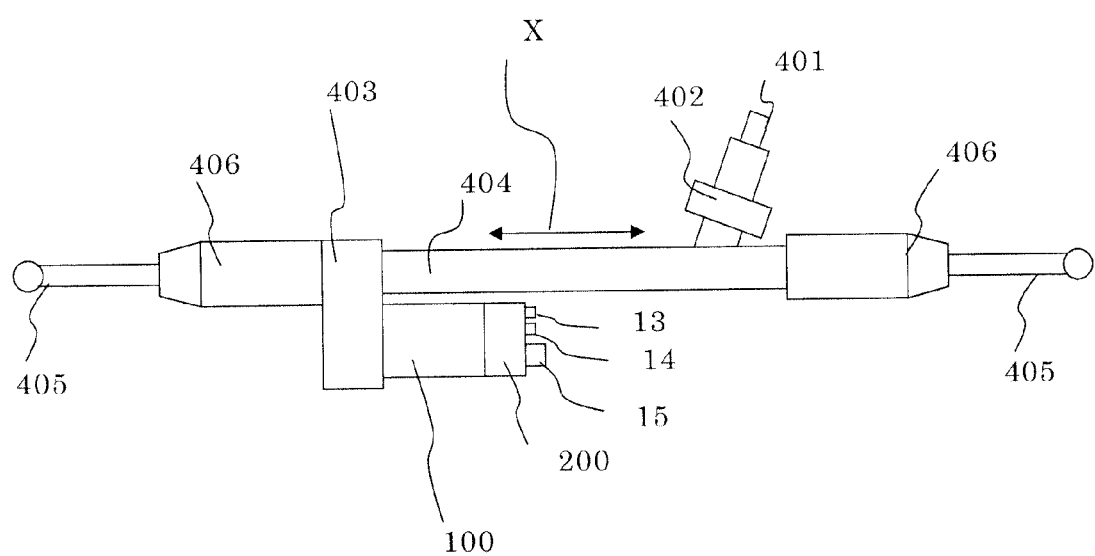
FIG. 6 is an explanation view of an electric power steering apparatus to which an electric drive apparatus of the present invention is applied.

FIG. 6 is an explanation view of an electric power steering apparatus of an automobile to which the electric drive apparatus of the present invention is applied. In FIG. 6, a driver performs steering of steering wheels (not shown in the drawing); and its torque is transmitted to a shaft 401 via a steering shaft (not shown in the drawing). At this time, torque detected by a torque sensor 402 is converted into an electrical signal to be transmitted to the electronic control unit (ECU) 200 serving as the control unit via the first connector 13 through a cable (not shown in the drawing). The ECU 200 is equipped with the inverter circuit which is for driving the control substrate and the motor as previously described. On the other hand, automobile information such as vehicle speed is converted into an electrical signal to be transmitted to the ECU 200 via the second connector 14. The ECU 200 calculates necessary assist torque from the torque and the automobile information such as vehicle speed and supplies current to the permanent magnet type motor 100 via the inverter. The motor 100 is disposed in a direction parallel to the movement direction (shown by an arrow X) of a rack axis. Furthermore, power source supply to the ECU 200 is performed from a battery or an alternator via the power source connector 15. Torque generated by the permanent magnet type motor 100 is decelerated by a gear box 403 in which a belt (not shown in the drawing) and a ball screw (not shown in the drawing) are incorporated and generates propulsive force that moves the rack axis (not shown in the drawing) disposed inside a housing 404 in the direction of the arrow X to assist steering force of the driver. This allows a tie-rod 405 to move and thus tires can be turned to circle the vehicle. The driver is assisted by the torque of the permanent magnet type motor 100 and can circle the vehicle with less sneering force. Incidentally, a rack boot 406 is provided so that a foreign substance does not enter into the device. Furthermore, the motor 100 and the ECU 200 are integrated to constitute the electric drive apparatus.

In this electric power steering apparatus, vibration and/or noise generated by the motor is transmitted to the driver and accordingly the vibration and/or noise is preferable to be small.

When the electric drive apparatus of the present Embodiment 1 is used in the electric power steering apparatus of the automobile, there can be obtained an effect that the apparatus can be reduced in size. Furthermore, the detection accuracy of the rotation angle of the motor is improved; and therefor, there can also be obtained an effect that vibration and/or noise is reduced.

Incidentally, the motor is the permanent magnet type motor in the present Embodiment 1; however, it goes without saying that the motor may be an induction motor, a synchronous reluctance motor, or a switched reluctance motor.

Incidentally, in addition to the configuration of the rotation angle sensor described in the present Embodiment 1, there is also conceivable a configuration in which a magnetic detection element is disposed on the outer circumferential side of the ring shaped magnet magnetized in multipoles according to the number of motor poles.

However, this configuration, the positional accuracy of the magnetic detection element, magnetization waveform distortion or eccentricity of the ring shaped permanent magnet magnetized in multipoles, and the like exert an extremely large influence on an angle error.

Accordingly, a problem is significant as the rotation sensor for use in the electric power steering apparatus. On the other hand, in the configuration of the present Embodiment 1, the magnetic sensor serving as the detection portion of the rotation angle sensor is disposed at a position coaxially with the rotating axis; and therefore, the influence on the angle error of positional deviation is small. Furthermore, the permanent magnet for the sensor, serving as the detected portion, is magnetized in two poles; and therefore, there can be obtained effects that the distortion of the magnetization waveform is hardly generated and the angle error can be reduced. Further, it becomes possible to function as a rotation sensor of 1× by two-pole magnetization and thus it can also correspond to driving of a motor with a number of optional poles Therefore, there can be obtained an effect that designing of the rotation sensor can be commonalized even a motor with a number of different poles. Further, there also exists an effect that the configuration is simple because of two poles.

Embodiment 2

Figure 7:
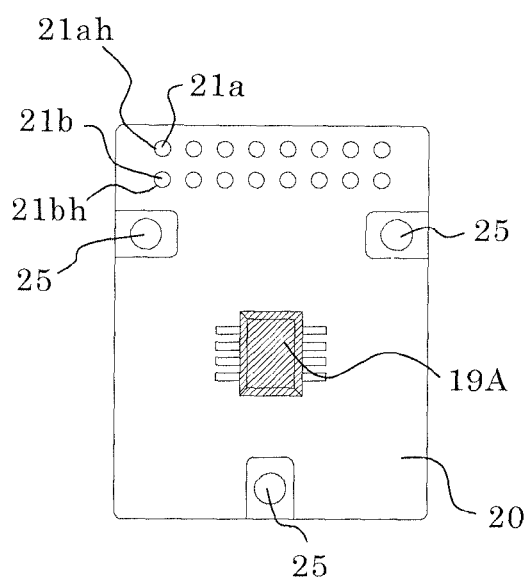
FIG. 7 are each an explanation view of a sensor portion according to Embodiment 2 of the present invention.
Figure 7:
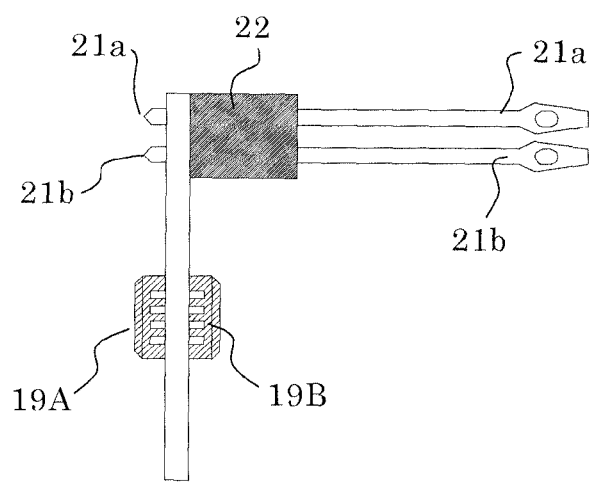

FIG. 7 are each an explanation view of a sensor portion according to Embodiment 2 of the present invention, in which two magnetic sensors are mounted; (a) is a view seen from the front side; and (b) is a view seen from the lateral side.

In FIG. 7, magnetic sensors 19A and 19B are mounted on a substrate 20. In Embodiment 2, a different point from FIG. 3 is that a total of two magnetic sensors, the magnetic sensor 19A and the magnetic sensor 19B, are mounted, one on each of the front and back sides of the substrate 20. Furthermore, the positions of two magnetic sensors 19A and 19B are arranged so as to be lined on the rotating axis of a motor.

By this arrangement, in the case of detecting a magnetic field generated by a permanent magnet for a sensor, serving as a detected portion, two magnetic sensors 19A and 19B can detect substantially the same directional magnetic flux density vectors; and therefore, two magnetic sensors can improve the detection accuracy of an angle.

A supporting member 22 integrated with connection members 21a and 21b are disposed on the substrate 20; and the connection members 21a and 21b and the substrate 20 are fixed by press-fitting or soldering. The connection members 21a and 21b on the opposite side to the substrate 20 when viewed from the supporting member 22 are electrically connected to a control substrate and this is also fixed by press-fitting or soldering. In the case of fixing by press-fitting, the space between the connection members 21a and between the connection members 21b can be narrowed; and therefore, reduction in size of the sensor portion and the control substrate can be achieved. Further, solder is not used; and therefore, there also exists an effect that a manufacturing process is simplified.

More particularly, in Embodiment 2 of FIG. 7, two magnetic sensors are mounted and accordingly the connection members 21a and 21b are needed more than FIG. 3. More specifically, in FIG. 7, a total of sixteen total connection members of eight connection members 21a for the magnetic sensor 19A and eight connection members b for the magnetic sensor B are provided. With that, eight holes for fixing connection members 21ah for the magnetic sensor 19A and eight holes for fixing connection members 21bh for the magnetic sensor 19B are also provided. If it is configured such that connection is performed by press-fitting, even when a large number of connection members are provided as described above, there exist effects that the space between the connection members can be narrowed and the sensor portion can be reduced in size.

Incidentally, the substrate 20 is formed with three screw holes 25 and is fixed to a heat sink by screws by using the holes 25. In addition, the number of the screw holes 25 are not limited to three and the positions of the screw holes are not also limited to the positions of FIG. 7.

As described above, according to Embodiment 2 of the present invention, two magnetic sensors are mounted on the substrate; and thus, even when one of sensor elements is undetectable in a duplex system, there can be obtained an effect of redundancy that a rotation angle of the motor can be detected by another sensor element. Further, two magnetic sensors are mounted on the front and back of the same substrate; and thus, two magnetic sensors can detect substantially the same directional magnetic flux density vectors. Therefore, two magnetic sensors can improve the detection accuracy of the angle. In addition, the rotation angle of the rotor of the motor can be estimated from angle information of two magnetic sensors; and therefore, there exists an effect that the rotation angle can be detected with higher accuracy.

Figure 8:
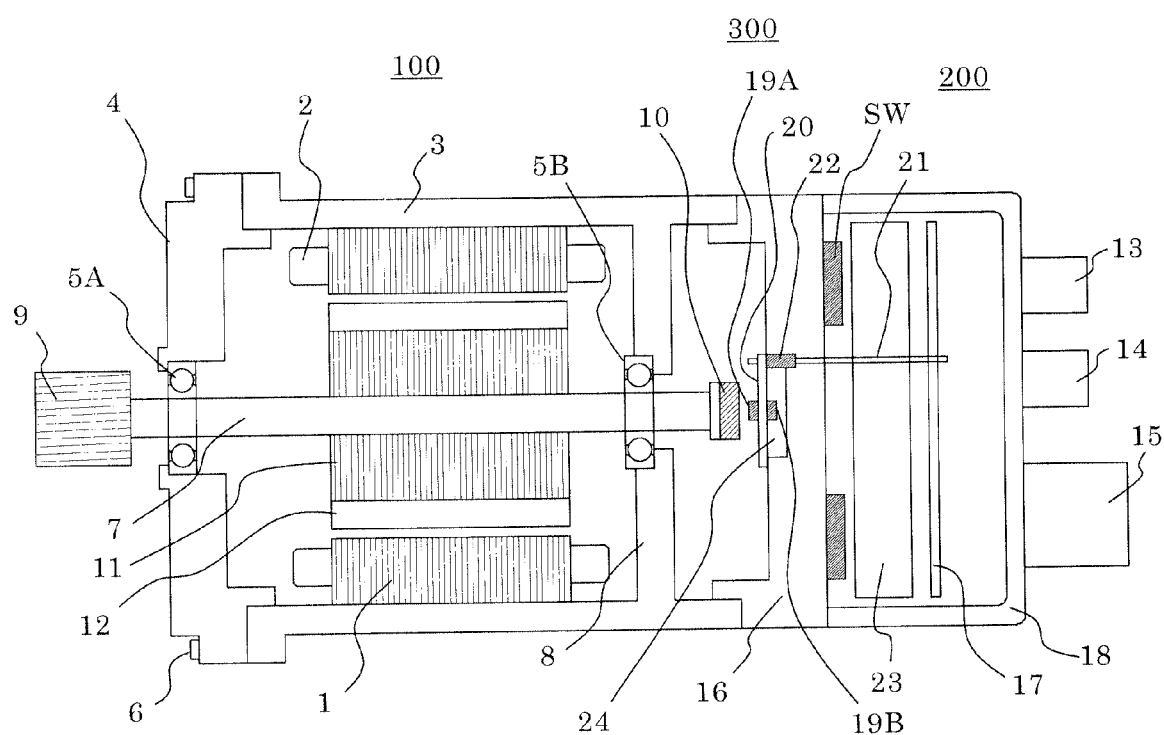
FIG. 8 is a schematic configuration view showing the whole configuration of an electric drive apparatus according to Embodiment 2 of the present invention.

FIG. 8 is a schematic configuration view showing the whole configuration of an electric drive apparatus according to Embodiment 2 of the present invention. A different point from FIG. 1 is that two magnetic sensors of the magnetic sensors 19A and 19B are mounted on a sensor portion 300. Incidentally, connection members of the sensor portion 300 are configured to be separated into the connection members 21a and the connection members 21b, which correspond to two magnetic sensors, the magnetic sensor 19A and the magnetic sensor 19B, as shown in FIG. 7; however, this configuration is omitted in FIG. 8 for simplicity.

A concave portion 24 is formed on a heat sink 16; the distance between the surface of the heat sink and the magnetic sensor 19A and the distance between the surface of the heat sink and the magnetic sensor 19B can be increased by the presence of the concave portion 24. In consequence, heat of the heat sink 16 is hardly transferred to the magnetic sensor 19A and the magnetic sensor 19B; and thus, rise in temperature of the magnetic sensor 19A and the magnetic sensor 19B can be suppressed. Consequently, there can be obtained an effect that the accuracy of the rotation angle can be improved.

Embodiment 3

Figure 9:
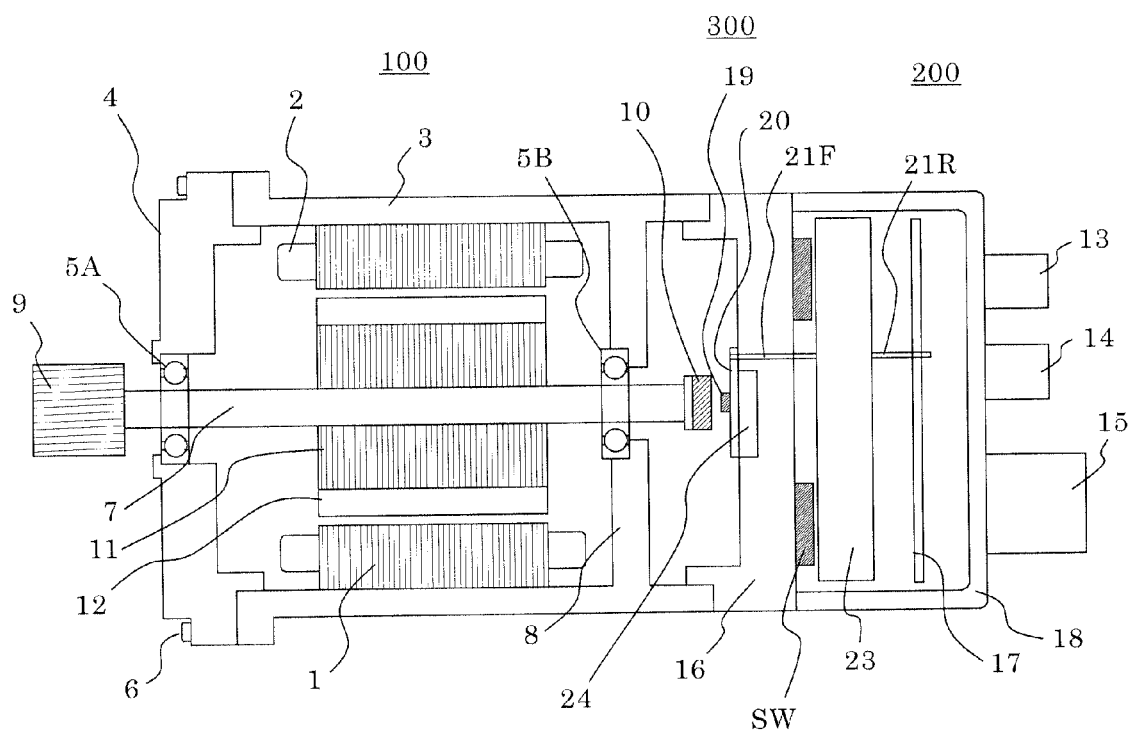
FIG. 9 is a schematic configuration view showing the whole configuration of an electric drive apparatus according to Embodiment 3 of the present invention.

FIG. 9 is a schematic configuration view showing the whole configuration of an electric drive apparatus according to Embodiment 3 of the present invention and is an example in which a connection member is integrally configured with an intermediate member.

A different point from FIG. 1 is that a connection member 21F serving as a first connection member that electrically connects between a sensor portion 300 and an intermediate member 23 and a connection member 21R serving as a second connection member that electrically connects between the intermediate member 23 and a control substrate 17 are configured so as to be integrated with the intermediate member 23. For example, the intermediate member 23 may be configured such that a busbar of an inverter circuit portion is insert-molded with resin and the connection member 21F and the connection member 21R may also be configured to be integrally formed.

Figure 10:
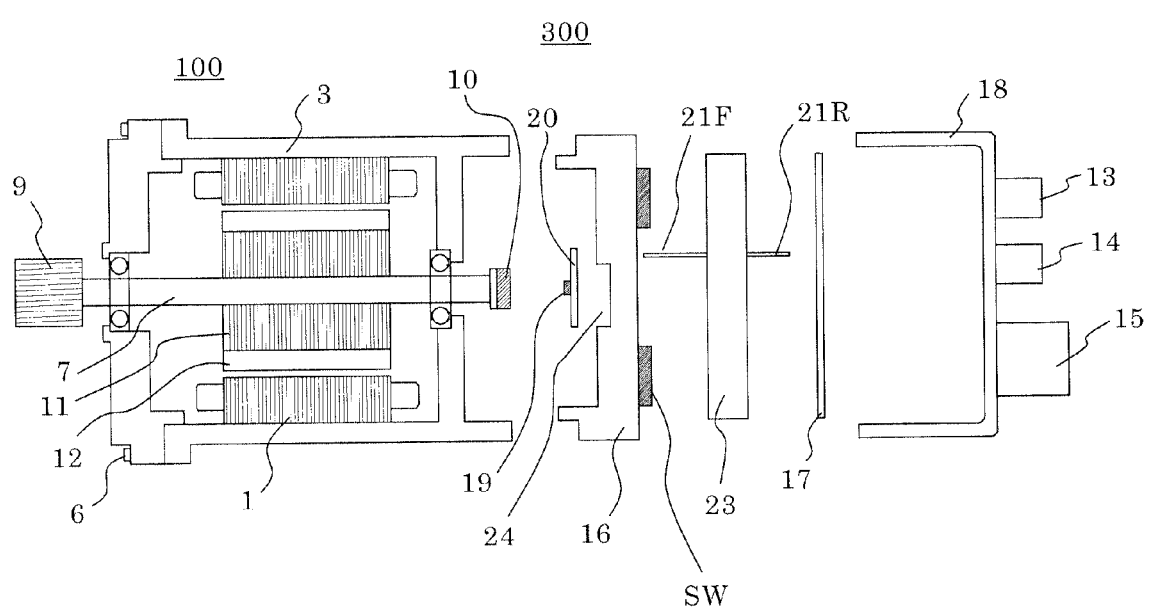
FIG. 10 is an explanation view of constituent components in which respective components of the electric drive apparatus of FIG. 9 are axially lined up.

FIG. 10 is a view in which respective constituent components of the electric drive apparatus of FIG. 9 are axially separated and lined up.

The connection member 21F and the connection member 21R are integrally configured with the intermediate member 23. The sensor portion 300 has a substrate 20 and a magnetic sensor 19, but does not have a connection member.

As described above, the connection member is not present in a state where the sensor portion 300 is assembled; and therefore, there exist effects that a protruded portion is not present, the structure of the sensor portion 300 is simple, and it is also advantageous in handling.

Embodiment 4

Figure 11:
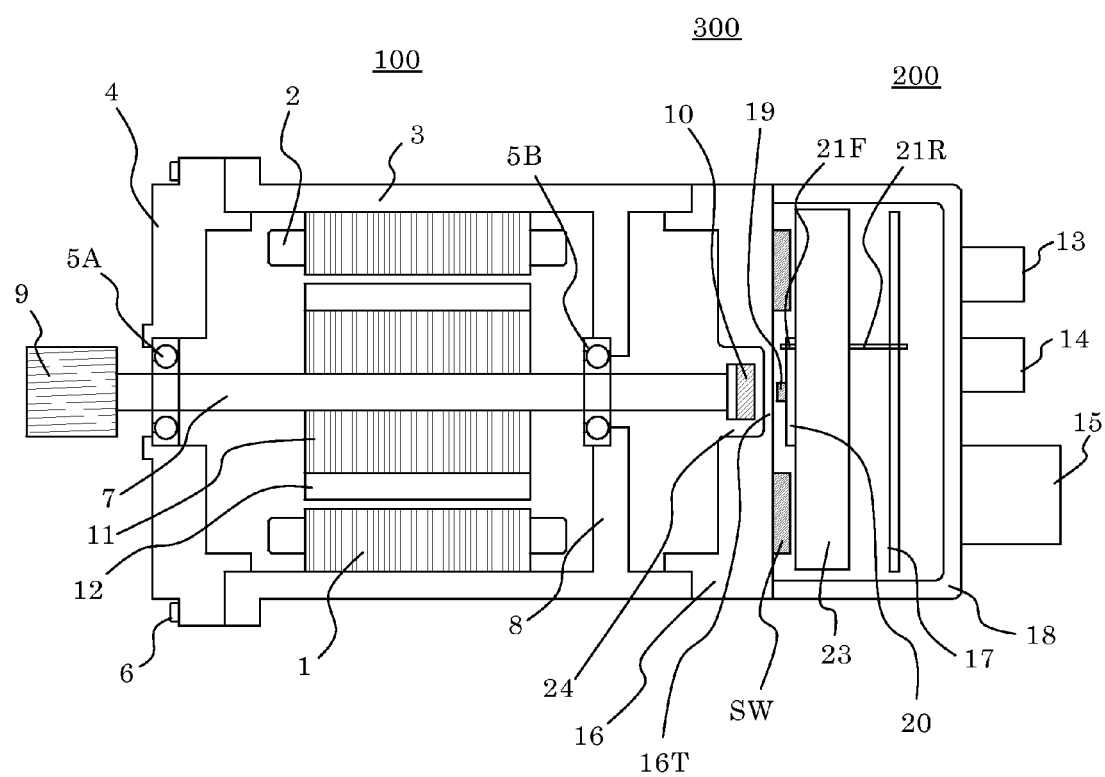
FIG. 11 is a schematic configuration view showing the whole configuration of an electric drive apparatus according to Embodiment 4 of the present invention.

FIG. 11 is a schematic configuration view showing the whole configuration of an electric drive apparatus according to Embodiment 4 of the present invention and is an explanation view of a configuration in which a sensor portion 300 is disposed on the opposite side to a motor 100 when viewed from a heat sink 16.

A concave portion 24 is formed on the heat sink 16 made of non-magnetic metal such as aluminum; and the thickness of the heat sink 16 at the concave portion 24 is thinner than other portion. Magnetic flux generated by a permanent magnet for a sensor 10 reaches the sink 16 on the opposite side to the motor 100 via a thinned portion of the heat sink 16T. The magnetic flux is detected by the magnetic sensor 300; and thus, a rotation angle of a rotor of the motor 100 can be detected.

By this configuration, the distance between the sensor portion 300 and an intermediate member 23 and between the intermediate member 23 and a control substrate 17 can be reduced; and therefore, there exist effects that the length of connection members 21F and 21R can be shortened and a reduction in weight and a reduction in material cost of the sensor portion 300 can be achieved. Furthermore, a hole through which the connection member passes through does not need to be formed in the heat sink 16; and therefore, there exists an effect that processing cost of the heat sink 16 can be reduced. Incidentally, the concave portion 24 is formed on the motor 100 side; however, it may be configured such that the concave portion is formed on the opposite side to the motor 100.

Figure 12:
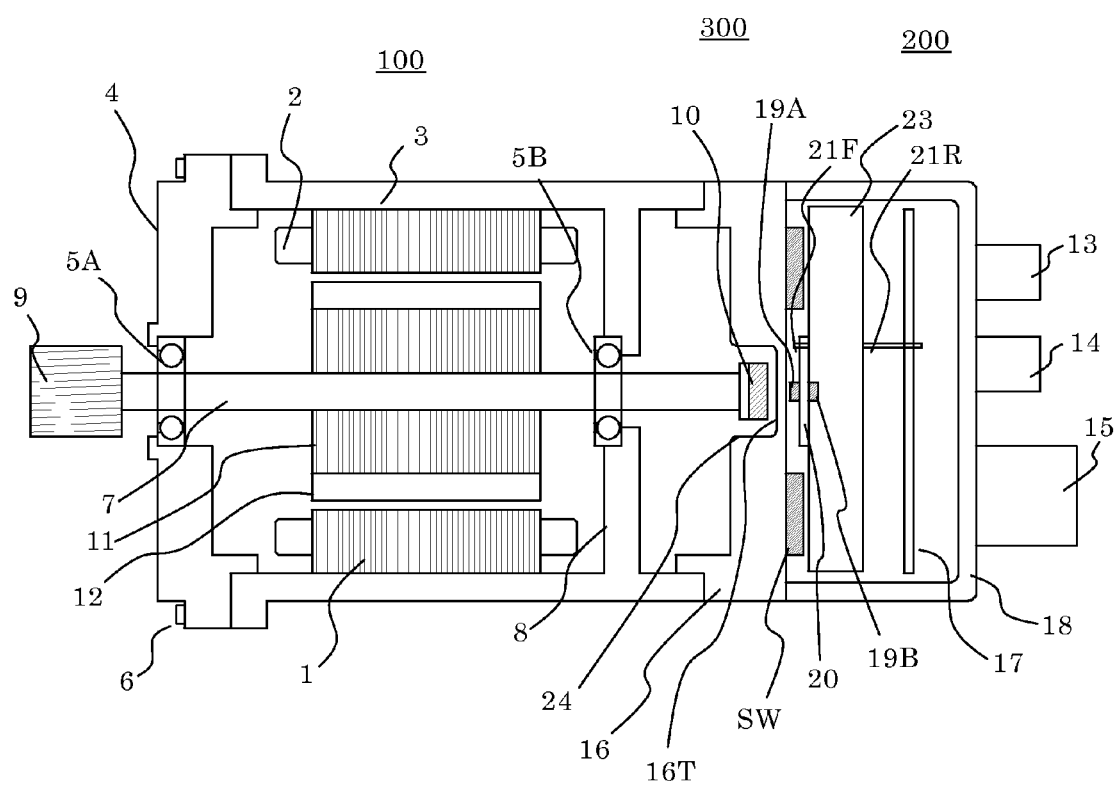
FIG. 12 is a modified example of Embodiment 4 of the present invention and is a schematic configuration view showing the whole configuration of an electric drive apparatus on which two magnetic sensors are mounted.

FIG. 12 is a modified example of Embodiment 4 of the present invention and is a schematic configuration view showing the whole configuration of an electric drive apparatus on which two magnetic sensors are mounted.

A different point from FIG. 11 is that two magnetic sensors of a magnetic sensor 19A and a magnetic sensor 19B are mounted on a sensor portion 300. Incidentally, connection members of the sensor portion 300 are configured to be separated into connection members 21a and connection members 21b, which correspond to two magnetic sensors, the magnetic sensor 19A and the magnetic sensor 19B, as shown in FIG. 7; however, this configuration is omitted in FIG. 12 for simplicity.

As described above, according to this embodiment of the present invention, two magnetic sensors 19A and 19B are mounted; and thus, there exists an effect that it can bring redundancy to the function of the sensor. Further, two magnetic sensors 19A and 19B are mounted on the front and back of the same substrate; and thus, two magnetic sensors 19A and 19B can detect substantially the same directional magnetic flux density vectors. Therefore, two magnetic sensors can improve the detection accuracy of the angle. In addition, the rotation angle of the rotor of the motor can be estimated from angle information of two magnetic sensors 19A and 19B; and therefore, there exists an effect that the rotation angle can be detected with higher accuracy.

Embodiment 5

Figure 13:
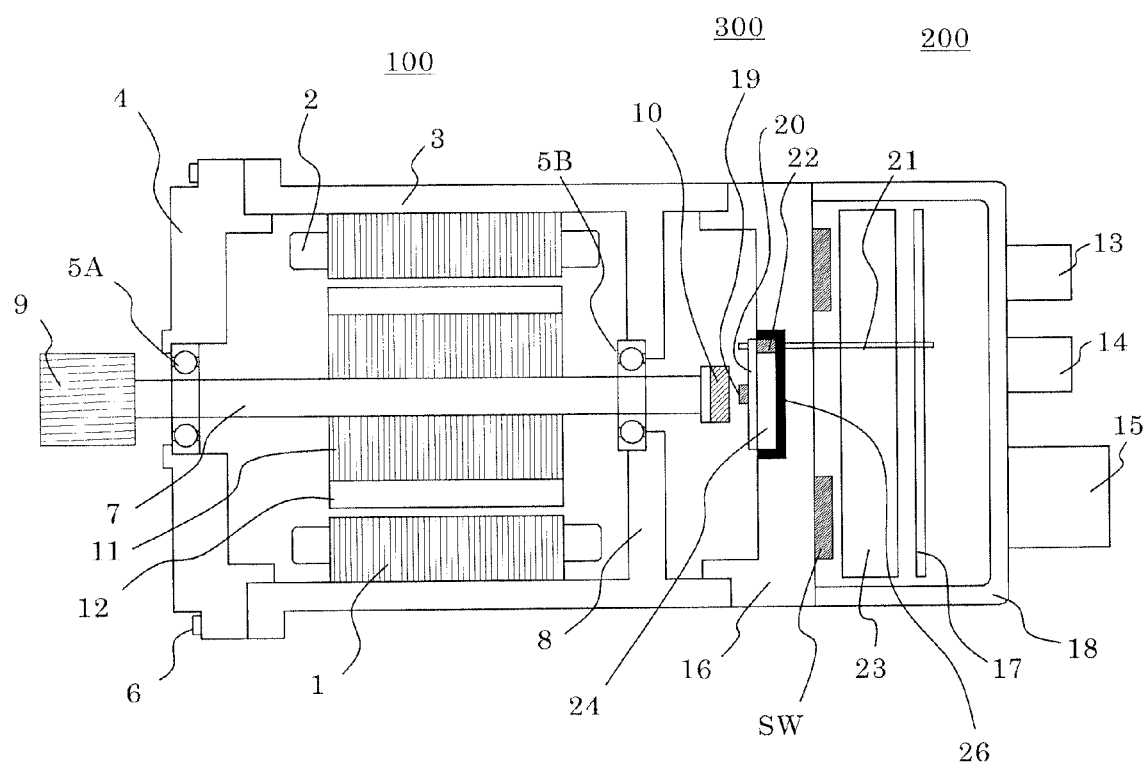
FIG. 13 is a schematic configuration view showing the whole configuration of an electric drive apparatus according to Embodiment 5 of the present invention.

FIG. 13 is a schematic configuration view showing the whole configuration of an electric drive apparatus according to Embodiment 5 of the present invention and is an explanation view of a structure in which a magnetic shield 26 is disposed between a sensor portion 300 and a heat sink 16. The magnetic shield 26 is made such that a plate of magnetic material such as iron is processed by sheet metal working and is screwed to the heat sink 16. If the magnetic shield 26 is disposed between the sensor portion 300 and the heat sink 16 in such a manner, magnetic flux generated by a switching element SW, a busbar of an inverter circuit, and the like in which large current flows, is shielded and is hardly influenced on a magnetic sensor 19; and therefore, there exists an effect that the detection accuracy of a rotation angle is improved.

Embodiment 6

Figure 14:
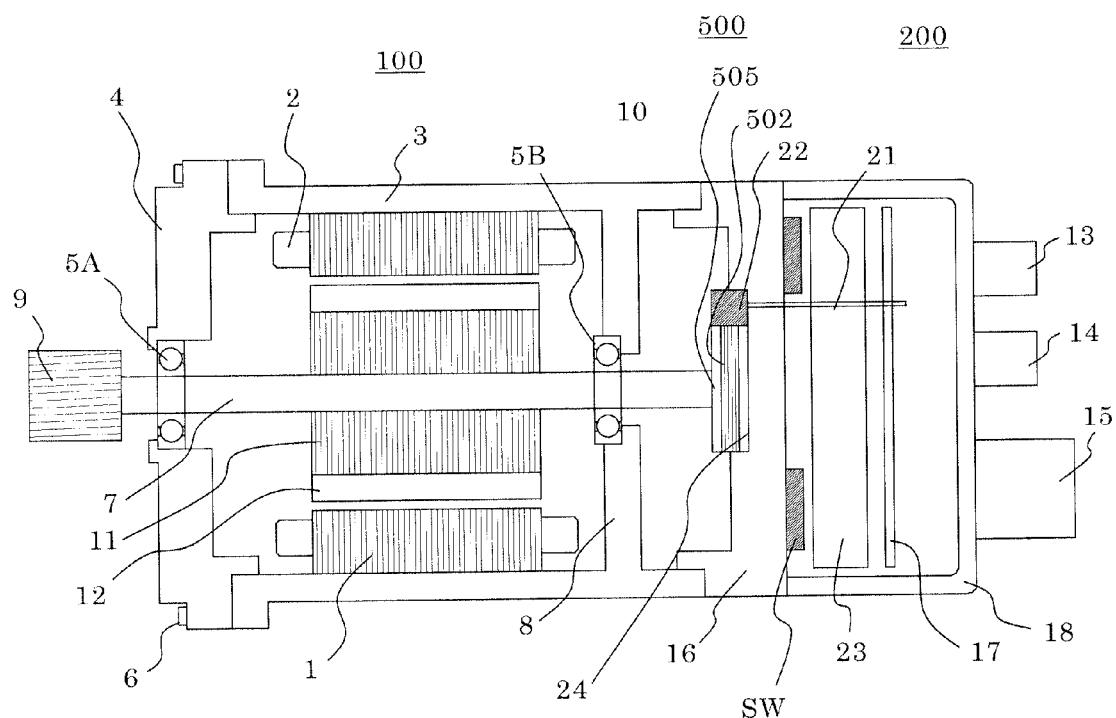
FIG. 14 is a schematic configuration view showing the whole configuration of an electric drive apparatus according to Embodiment 6 of the present invention.

FIG. 14 is a schematic configuration view showing the whole configuration of an electric drive apparatus according to Embodiment 6 of the present invention and is an explanation view of a configuration in which a rotation angle sensor is a resolver 500.

Different points from FIG. 1 are that the resolver 500 is disposed on a heat sink 16; and, as a detected portion, a permanent magnet for a sensor is not disposed, but a resolver rotor (not shown in FIG. 14) is disposed at one end of a shaft 7 by press-fitting.

Figure 15:
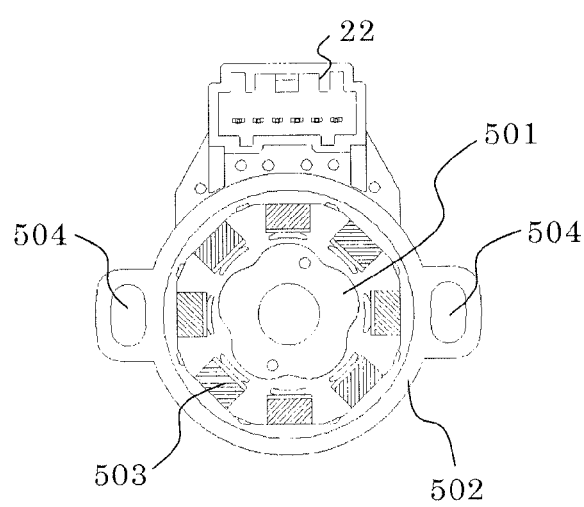
FIG. 15 are each an explanation view of a resolver disposed in the electric drive apparatus of Embodiment 6 of the present invention.
Figure 15:
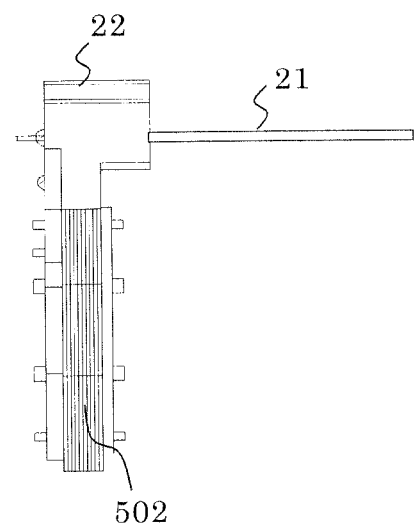

The structure of the resolver in Embodiment 6 is shown in FIG. 15. FIG. 15(a) is a view seen from the rear side; and FIG. 15(b) is a view seen from the lateral side. In FIG. 15, a resolver rotor 501 formed by laminating magnetic steel sheets is a shape in which an outward shape has a convex portion so as to change a gap permeance. The number of the convex portions is selected according to the number of motor poles. In FIG. 15, five convex portions are provided; and thus five changes in gap permeance can be obtained by one rotation. Therefore, it operates as a resolver having an axial double angle of 5× suitable for driving a motor with a number of pole pairs of five.

Incidentally, FIG. 15 show an example of 5×; however, it goes without saying that even 1× may be permissible. Furthermore, design may be made according to the number of motor pole pairs.

A resolver stator core 502 is disposed outside the resolver rotor 501. Coils 503 are wound on the resolver stator core 502 and the coils 503 are composed of one phase excitation winding and two phase output windings. Although omitted in FIG. 15, the coils 503 are protected by a resin-made cover 505 or the like. Furthermore, the heat sink 16 is formed with screw holes 504 to fix the resolver stator core 502. Electrical connection with a control substrate 17 is performed by a connection member 21 and is fixed by press-fitting or soldering. The connection member 21 is supported by a resin-made supporting member 22. The resolver stator core 502, the coil 503, the cover 505, the connection member 21, and the supporting member 22 constitute a detection portion.

The resolver 500 is composed of the core 502, the coil 503, the connection member 21, the supporting member 22, and the cover 505; and there exist effects that the structure is simple and vibration resistance is improved as compared with a magnetic sensor using a semiconductor. Furthermore, a heat resistant temperature becomes high as compared with the magnetic sensor; and therefore, there exists an effect that a use temperature range of the electric drive apparatus can be expanded. Besides, a part of the resolver is disposed to be embedded in the heat sink 16 by providing a structure in which a concave portion is formed on the heat sink 16; and thus, there exists an effect that the axial size of the electric drive apparatus can be reduced.

Further, the resolver 500 is disposed so that the coil 503 surrounds the whole circumference around the resolver rotor 501; and thus, a configuration is made such that even if the resolver rotor 501 is off-centered, its influence is reduced. On the other hand, there is also conceivable a configuration in which a magnetic detection element is disposed on the outer circumferential side of a ring shaped magnet magnetized in multipoles according to the number of motor poles; however, a large number of magnetic detection elements need to be disposed on the periphery of the ring shaped magnet in order to reduce the influence of eccentricity by this configuration and this leads to an increase in cost and an increase in size of the sensor.

INDUSTRIAL APPLICABILITY

An electric drive apparatus of the present invention is particularly suitable for use in an electric power steering apparatus for a vehicle.

DESCRIPTION OF REFERENCE NUMERALS

1: Stator core, 2: Armature winding, 3: Frame, 5A and 5B: Bearing, 7: Shaft, 7a: Rotating axis, 8: Wall portion, 9: Pulley 10, 10M, and 10C: Permanent magnet for sensor, 10S: Permanent magnet supporting portion, 13: First connector, 14: Second connector, 15: Power source connector, 16: Heat sink, 16T: Thinned portion of heat sink, 17: Control substrate, 18: Case, 19, 19A, and 19B: Magnetic sensor, 20: Substrate, 21, 21a, 21b, 21F, and 21R: Connection member, 22: Supporting member, 23: Intermediate member, 24: Concave portion, 25: Screw hole, 26: Magnetic shield, SW: Switching element, 100: Permanent magnet type motor, 200: Control unit (electronic control unit (ECU)), 300: Sensor portion, 401: Shaft, 402: Torque sensor, 403: Gear box, 404: Housing, 405: Tie-rod, 406: Rack boot, 500: Resolver, 301: Resolver rotor, 502: Resolver stator core, 503: Coil, 504: Screw hole, 505: Cover

The invention claimed is:

1. An electric drive apparatus equipped with a motor and a control unit serving as a drive device portion disposed on the opposite side to the output axis side of said motor, said electric drive apparatus comprising:
   a detected portion of a rotation angle sensor, said detected portion being disposed at an end of a shaft on the opposite side to the output axis side of said motor; and
   a sensor portion serving as a detection portion of said rotation angle sensor, said sensor portion being disposed at a position coaxially with the rotating axis of said shaft,
   said control unit including: an inverter circuit portion having a drive element which is attached to a heat sink and is for driving said motor; and a control substrate which is separate from said sensor portion and controls the output of said inverter circuit portion; and
   said sensor portion and said control substrate being electrically connected and the arrangement of said control substrate being disposed along a plane perpendicular to the rotating axis of said shaft of said motor.

2. The electric drive apparatus according to claim 1, wherein said sensor portion has a substrate;
   said substrate is mounted with a magnetic sensor;
   said substrate is provided with a connection member to be electrically connected to said control substrate and said sensor portion, and a supporting member to be integrated with said connection member; and
   said connection member passes through said inverter circuit portion.

3. The electric drive apparatus according to claim 1, wherein said sensor portion is disposed on a heat sink of said inverter circuit portion and is disposed on the motor side when viewed from said heat sink.

4. The electric drive apparatus according to claim 1, wherein said sensor portion is electrically connected to said control substrate directly.

5. The electric drive apparatus according to claim 1, further comprising an intermediate member disposed between said heat sink and said control substrate, and wherein electrical connection between said sensor portion and said control substrate is positioned by said intermediate member.

6. The electric drive apparatus according to claim 5, wherein said intermediate member is configured so that a first connection member to be electrically connected to said sensor portion and a second connection member to be electrically connected to said control substrate are integrated.

7. The electric drive apparatus according to claim 1, wherein press-fitting is used for electrical connection between said sensor portion and said control substrate.

8. The electric drive apparatus according to claim 1, wherein said detected portion has a permanent magnet; said sensor portion has a magnetic sensor; and said magnetic sensor is disposed at a position facing said permanent magnet.

9. The electric drive apparatus according to claim 8, wherein said permanent magnet is magnetized in two poles and a magnetized direction is formed on a flat plane perpendicular to the rotating axis of said shaft.

10. The electric drive apparatus according to claim 8, wherein said sensor portion has a substrate; and said substrate is disposed such that at least one surface of said substrate is mounted with said magnetic sensor and the other side of said substrate is also mounted with a component.

11. The electric drive apparatus according to claim 8, wherein said sensor portion has a substrate; and said substrate is disposed such that at least two magnetic sensors are mounted on both surfaces of said substrate at positions coaxially with the rotating axis of said shaft.

12. The electric drive apparatus according to claim 1, wherein said sensor portion has a substrate;

said substrate is mounted with a magnetic sensor; and said substrate is fixed to said heat sink by screw-fastening.

13. The electric drive apparatus according to claim 1, further comprising a magnetic shield disposed between said sensor portion and said heat sink.

14. The electric drive apparatus according to claim 1, wherein said detected portion of said rotation angle sensor has a protruded portion and is configured by a rotor for a sensor, said rotor having magnetism; and said sensor portion is a resolver which is configured by a coil composed of an excitation winding an output winding and a stator for a sensor, said stator having core.

\* \* \* \* \*